(12) United States Patent
Mercer et al.

(10) Patent No.: US 10,724,753 B2
(45) Date of Patent: Jul. 28, 2020

(54) SYSTEM AND METHOD FOR OPERATING A VARIABLE SPEED COMPRESSOR

(71) Applicant: Carrier Corporation, Palm Beach Gardens, FL (US)

(72) Inventors: Kevin Mercer, Danville, IN (US); Jun Pyo Lee, Zionsville, IN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 451 days.

(21) Appl. No.: 15/389,214

(22) Filed: Dec. 22, 2016

(65) Prior Publication Data
US 2017/0184321 A1 Jun. 29, 2017

Related U.S. Application Data

(60) Provisional application No. 62/272,200, filed on Dec. 29, 2015.

(51) Int. Cl.
F24F 11/30 (2018.01)
F24F 11/83 (2018.01)
F24F 11/70 (2018.01)
F24F 11/64 (2018.01)
F24F 110/12 (2018.01)
(Continued)

(52) U.S. Cl.
CPC .............. *F24F 11/30* (2018.01); *F24F 11/70* (2018.01); *F24F 11/83* (2018.01); *F24F 11/61* (2018.01); *F24F 11/64* (2018.01); *F24F 2110/10* (2018.01); *F24F 2110/12* (2018.01);
(Continued)

(58) Field of Classification Search
CPC .. F24F 11/30; F24F 11/83; F24F 11/70; F24F 11/61; F24F 2130/20; F24F 2110/20; F24F 2110/12; F24F 2110/10; F24F 11/64; G05B 2219/2614
See application file for complete search history.

(56) References Cited

U.S. PATENT DOCUMENTS 4,269,261 A 5/1981 Kountz et al.
4,364,237 A 12/1982 Cooper et al.
(Continued)

FOREIGN PATENT DOCUMENTS

CN 103982983 A 8/2014
CN 104101044 A 10/2014
(Continued)

*Primary Examiner* — Kenneth M Lo
*Assistant Examiner* — Istiaque Ahmed
(74) *Attorney, Agent, or Firm* — Cantor Colburn LLP

(57) ABSTRACT

A method of operating a variable speed compressor, the variable speed compressor in electrical communication with a computing element and the computing element in electrical communication with a sensing device, the method including operating the computing element to transmit a control signal to the compressor to operate in an operational mode, operating the computing element to receive outdoor air temperature data from the sensing device, operating the computing element to determine an operational run time value of the compressor based in part on the outside air temperature data, operating the computing element to determine an estimated day period based in part on the control signal, and operating the compressor at an operational speed based in part on the outdoor air temperature data, the operational run time value, and the estimated day period.

18 Claims, 2 Drawing Sheets

(51) Int. Cl.
   *F24F 110/10* (2018.01)
   *F24F 11/61* (2018.01)
   *F24F 130/20* (2018.01)
   *F24F 110/20* (2018.01)

(52) U.S. Cl.
   CPC ....... *F24F 2110/20* (2018.01); *F24F 2130/20* (2018.01); *G05B 2219/2614* (2013.01)

(56) References Cited

U.S. PATENT DOCUMENTS

| | | | |
|---|---|---|---|
| 4,748,822 A * | 6/1988 | Erbs | F24F 3/001 |
| | | | 165/217 |
| 6,860,431 B2 | 3/2005 | Jayadev | |
| 8,011,199 B1 | 9/2011 | Chen et al. | |
| 8,341,973 B2 | 1/2013 | Liu | |
| 8,457,933 B2 | 6/2013 | Yoo et al. | |
| 9,062,891 B2 | 6/2015 | Li et al. | |
| 2006/0158051 A1* | 7/2006 | Bartlett | F24F 11/0001 |
| | | | 310/62 |
| 2015/0204593 A1 | 7/2015 | Luo et al. | |
| 2015/0276291 A1* | 10/2015 | Pham | F25B 13/00 |
| | | | 62/115 |
| 2016/0313039 A1* | 10/2016 | Popli | F25B 49/022 |

FOREIGN PATENT DOCUMENTS

| | | |
|---|---|---|
| CN | 104729002 A | 6/2015 |
| CN | 104764145 A | 7/2015 |
| WO | 2010141614 A2 | 12/2010 |

* cited by examiner

SYSTEM AND METHOD FOR OPERATING A VARIABLE SPEED COMPRESSOR

CROSS-REFERENCE TO RELATED APPLICATIONS

The present application is a nonprovisional patent application, which claims priority to 62/272,200, filed Dec. 29, 2016, which is herein incorporated in its entirety.

TECHNICAL FIELD OF THE DISCLOSED EMBODIMENTS

The presently disclosed embodiments generally relate to heating, ventilation, and air conditioning ("HVAC") systems, and more particularly, to a system and method of operating a variable speed compressor.

BACKGROUND OF THE DISCLOSED EMBODIMENTS

Variable capacity HVAC systems are typically controlled by electronic thermostats containing microprocessors which continuously monitor indoor air temperature and/or indoor air humidity. The thermostat temperature set point, and/or indoor air humidity set point is/are compared to the sensed or monitored temperature, or humidity value and the microprocessor in the thermostat evaluates a specific differential to generate a control signal.

To typically control a variable capacity compressor, as is found in some HVAC systems, the compressor speed and/or capacity are communicated to the thermostat over a communicating system bus via a software protocol. However, a thermostat containing a microprocessor configured to communicate commands and receive data over a system bus increases the cost of the HVAC system, which may create a barrier for users to enjoy the comfort and economic benefits of a variable capacity HVAC system.

Accordingly, there exists a need to control a variable speed compressor without the need for expensive communicating control, or the added features that a communicating control offers.

SUMMARY OF THE DISCLOSED EMBODIMENTS

In one aspect, a method of operating a variable speed compressor is provided. The variable speed compressor being in electrical communication with a computing element and the computing element in electrical communication with a sensing device. The method including: operating the computing element to transmit a control signal to the compressor to operate in an operational mode, operating the computing element to receive outdoor air temperature data from the sensing device, operating the computing element to determine an operational run time value of the compressor based in part on the outside air temperature data, operating the computing element to determine an estimated day period based in part on the control signal, and operating the compressor at an operational speed based in part on the outdoor air temperature data, the operational run time value, and the estimated day period.

In one embodiment, operating the computing element to transmit a control signal to the compressor to operate in an operational mode further includes operating the computing element to receive the control signal from a thermostat. In an embodiment, the operational mode is chosen from a group consisting of a heating mode, a cooling mode, and a dehumidification mode.

In one embodiment, operating the compressor at an operational speed based in part on the outdoor air temperature data, the operational run time value, and the estimated day period further includes operating the computing element to transmit a speed signal to the compressor, wherein the speed signal is indicative of the operational speed.

In one embodiment, operating the computing element to determine an operational run time value of the compressor based in part on the outside air temperature data further includes operating the computing element to determine if the operational run time is greater than a pre-determined maximum operational threshold or less than a pre-determined minimum operational threshold.

In one aspect, an HVAC assembly is provided. The HVAC assembly includes an outdoor HVAC unit including a variable speed compressor in communication with a computing element. The computing element is configured to operate the variable speed compressor at an operational speed based in part on outdoor air temperature data, an operational run time value, and an estimated day period. In an embodiment, the HVAC assembly further includes a sensing device in electrical communication with the computing element, wherein the sensing device is configured to measure outdoor air temperature data.

In one embodiment, the HVAC assembly further includes a thermostat in electrical communication with the computing element. The thermostat is configured to transmit a control signal to the computing element.

In an embodiment, the computing element is further configured to: transmit the control signal to the variable speed compressor to operate in an operational mode, receive the outdoor air temperature data from the sensing device, determine an operational run time value of the variable speed compressor based in part on the outside air temperature data, and determine an estimated day period based in part on the control signal. In one embodiment, the computing element is further configured to receive the temperature signal from a thermostat. In one embodiment, the operational mode is chosen from a group consisting of a heating mode, a cooling mode, and a dehumidification mode.

In one embodiment, the computing element is further configured to transmit a speed signal to the variable speed compressor, wherein the speed signal is indicative of the operational speed. In one embodiment, the computing element is further configured to determine if the operational run time is greater than a pre-determined maximum operational threshold and less than a pre-determined minimum operational threshold.

In one aspect, a controller for use to control a variable speed compressor is provided. The controller includes a processor in communication with a memory, wherein the processor is configured to operate a program stored in memory. The program is configured to: transmit a control signal to the variable speed compressor to operate in an operational mode, receive outdoor air temperature data, determine an operational run time value of the compressor based in part on the outside air temperature data, determine an estimated day period based in part on the control signal, and operate the compressor at an operational speed based in part on the outdoor air temperature data, the operational run time value, and the estimated day period.

In one embodiment, the program is further configured to receive the control signal. In one embodiment, the operational mode is chosen from a group consisting of a heating mode, a cooling mode, and a dehumidification mode.

In one embodiment, the program is further configured to transmit a speed signal to the compressor, wherein the speed signal is indicative of the operational speed. In one embodiment, the program is further configured to determine if the operational run time is greater than a pre-determined maximum operational threshold or less than a pre-determined minimum operational threshold.

DETAILED DESCRIPTION OF THE DISCLOSED EMBODIMENTS

Figure 1:
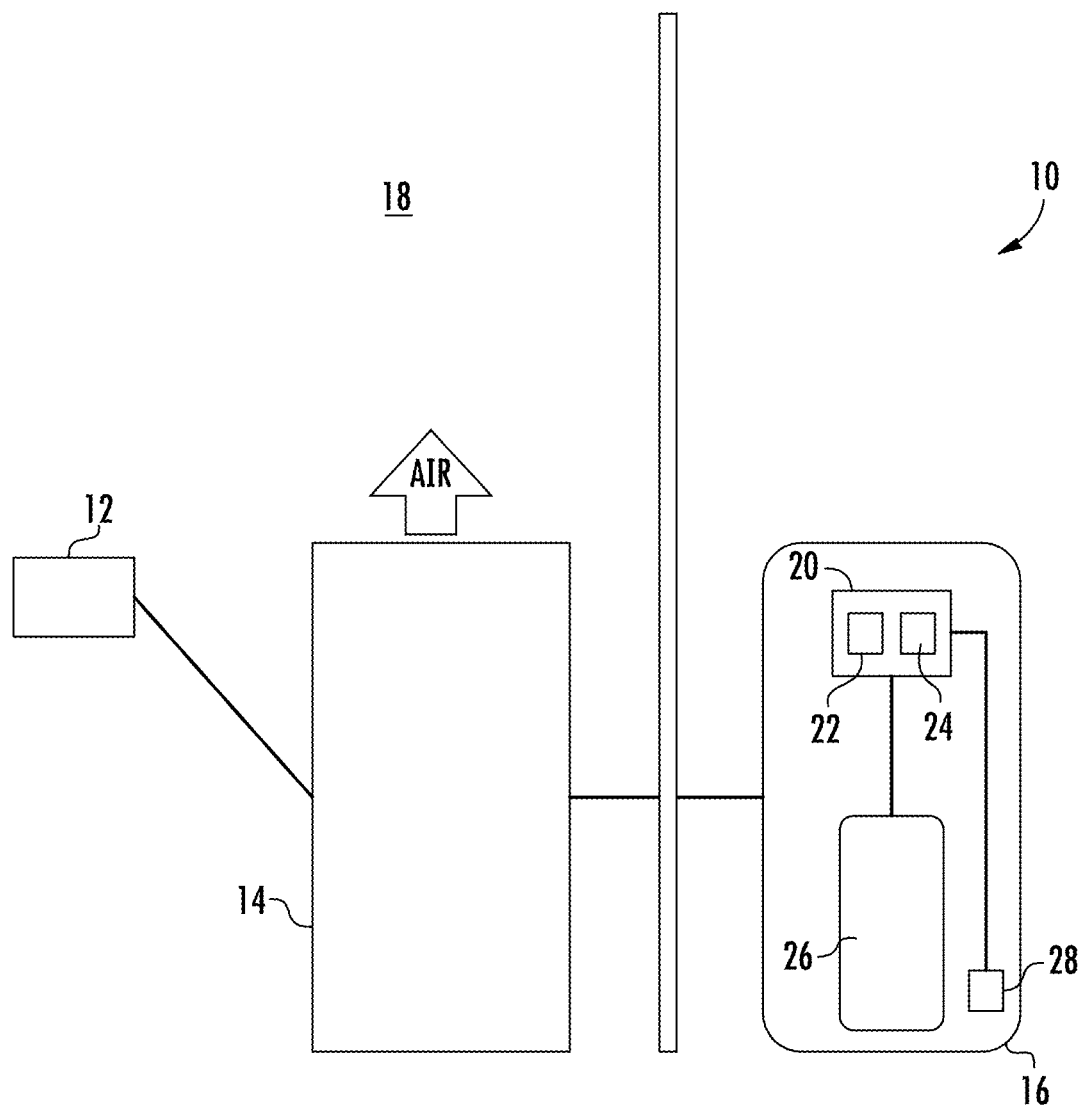
FIG. 1 illustrates a schematic diagram of an HVAC assembly according to an embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 schematically illustrates an embodiment of an HVAC assembly, generally indicated at 10. In the embodiment shown, the HVAC assembly 10 includes a thermostat 12 in electrical communication with an indoor HVAC unit 14, for example a fan coil to name one non-limiting example. The HVAC assembly 10 further includes an outdoor HVAC unit 16 operably coupled to the indoor HVAC unit 14. It will be appreciated the outdoor HVAC unit 16 may be a heat pump, air conditioner, and/or a packaged unit to name a few non-limiting examples. The indoor HVAC unit 14 and the outdoor HVAC unit 16 are configured to operate in tandem to condition air within an interior space 18.

Thermostat 12 monitors the difference between the actual temperature of the air within the interior space 18 and the preset temperature which is desired, both of which may be indicated on the thermostat 12. It will be appreciated that thermostat 12 includes a temperature setting feature which permits a user to indicate a preselected temperature which is the desired temperature of the air surrounding the thermostat 12 within the interior space 18. It will further be appreciated that thermostat 12 also includes a device for measuring the temperature of the air surrounding the thermostat 12 and generating a control signal, such as an on/off signal, to the indoor HVAC unit 14 and/or the outdoor HVAC unit 16. The control signal has a cyclic parameter corresponding to the temperature of the air surrounding the thermostat 12. For example, the control signal for heating may be an on/off signal indicating that the air temperature is below/above the preselected temperature. Similarly, the control signal for cooling may be an on/off signal indicating that the air temperature is above/below the preselected temperature or the measured humidity is above a desired humidity level. The thermostat 12 may include a feedback to the user indicating the approximate preset or desired temperature and/or humidity.

The outdoor HVAC unit 16 includes a computing element 20, including a microprocessor 22 and a memory 24, in electrical communication with a compressor 26. In an embodiment, the compressor 26 is configured to operate at a plurality of speeds. In one embodiment, the outdoor HVAC unit 16 includes a sensing device 28 in electrical communication with the computing element 20. The sensing device 28 is configured to measure an outdoor air temperature. It will be appreciated that the sensing device 28 may be external and/or remote to the outdoor HVAC unit 16, such as a wired or wireless sensor. In one embodiment, the sensing device 28 may be internal to the outdoor HVAC unit 16. In one embodiment, the sensing device 28 may be data obtained from the internet or some other remote network source. Computing element 20 is configured to operate the compressor 26 in accordance with the method disclosed in FIG. 2.

Figure 2:
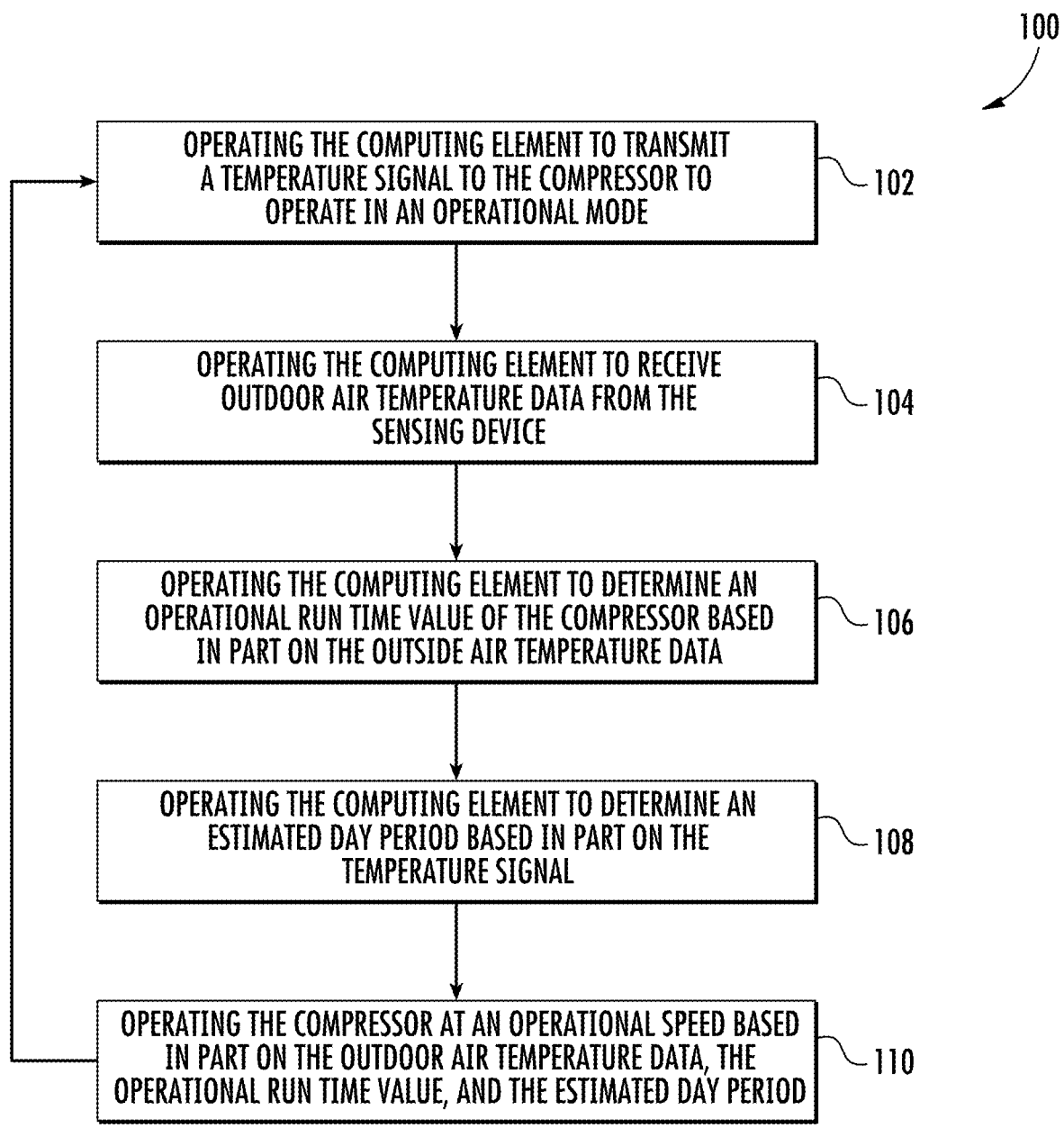
FIG. 2 illustrates a schematic flow diagram of a method of operating a variable speed compressor according to an embodiment of the present disclosure.

FIG. 2 illustrates a method of operating the compressor 26 of the outdoor HVAC unit 16, the method generally indicated at 100. The method 100 includes step 102 of operating the computing element 20 to transmit the control signal to the compressor 26 to operate in an operational mode. In an embodiment, the operational mode is chosen from the group consisting of a heating mode, a cooling mode, and a dehumidification mode. In an embodiment, step 102 further includes operating the computing element 20 to receive the control signal from the thermostat 12.

The method 100 includes step 104 of operating the computing element 20 to receive outdoor air temperature data from the sensing device 28. For example, the sensing device 28 measures the temperature of the outside air surrounding the outside HVAC unit 16. The computing element 20 receives the outdoor temperature data and places it in the memory 24 to use as a part of determining an operational speed of the compressor 26.

The method 100 further includes step 106 of operating the computing element 20 to determine an operational run time value of the compressor 26 based in part on the outside air temperature data. The operational run time of the compressor 26 may be the time duration the compressor 26 is operational between receiving the control signal (i.e., on signal and the off signal) from the computing element 20.

The method 100 further includes step 108 of operating the computing element 20 to determine an estimated day period based in part on the control signal. For example, once the computing element 20 transmits the control signal to turn on the compressor 26, the microprocessor 22 determines an estimated day period (i.e., an estimated time period within a 24-hour time of day, such as day/night/morning/afternoon/ etc., a particular hour, or an exact time) corresponding to when the control signal was transmitted.

The method further includes step 110 of operating the compressor 26 at an operational speed based in part on the outdoor air temperature data, the operational run time value, and the estimated day period. In an embodiment, step 110 further includes operating the computing element 20 to transmit a speed signal to the compressor 26, wherein the speed signal is indicative of the desired operational speed. In an embodiment, step 110 further includes operating the computing element 20 to determine if the operational run time is greater than a pre-determined maximum operational threshold or less than a pre-determined minimum operational threshold.

In an example of operation, the thermostat 12 may receive an on control signal to operate the HVAC system 10 in a cooling mode. The microprocessor 22 receives outside temperature data, for example an outdoor air temperature of approximately 86° Fahrenheit (approximately 30° Celsius) from the sensing device 28 at the time the on control signal is received.

The microprocessor 22 then determines the time of day, for example 1:00 PM, the on control signal is received. The microprocessor 22 reviews the data in memory 24 to determine if the compressor 26 operated in the past under the same conditions (for example, within ±15 minutes of the given time or day and an outdoor air temperature within ±1° F., to name a couple of non-limiting examples). It will be appreciated that the time of day may be greater than or less than the ±15 minutes, and the outdoor air temperature may be greater than or less than ±1° F. listed in the example. If the compressor 26 operated in the past under the same conditions, the microprocessor 22 determines whether the last recorded operational run time is greater than a pre-determined maximum operational threshold (e.g. approximately 60 minutes) or less than a pre-determined minimum operational threshold (e.g. approximately 30 minutes). It will be appreciated that the pre-determined maximum operational threshold may be greater than or less than approximately 60 minutes, and the pre-determined minimum operational threshold may be greater than or less than approximately 30 minutes. It will further be appreciated that the pre-determined maximum operational threshold and the pre-determined minimum operational threshold may be set by the manufacturer and/or may be adjusted in the field by installers or service personnel.

If the operational run time is less than the pre-determined maximum operational threshold and greater than the pre-determined minimum operational threshold the microprocessor 22 operates the compressor 26 at the last recorded operational speed (e.g. 3000 revolutions per minute, RPM) for the given outdoor air temperature and time of day. In other words, if the compressor 26 is meeting the demand within the pre-determined operational run time range; then, the compressor 26 will operate at the last recorded an operational speed.

If the operational run time is greater than the pre-determined maximum operational threshold, it may be indicative that the operating capacity of the compressor 26 is too low resulting in a slower time to meet the desired demand. As such, the microprocessor 22 may increase the operational speed of the compressor 26 by an increasing value (e.g., 10%, 3300 RPM) to effectively increase the capacity of the compressor 26 to meet the desired temperature and/or humidity setting within the interior space 18. Alternatively, if the operational run time is less than a pre-determined minimum operational threshold, it may be indicative that the operating capacity is too high, resulting in a shorter, but inefficient manner of meeting the desired demand. As such, the microprocessor 22 may decrease the operational speed of the compressor 26 by a decreasing value (e.g., 10%, 2700 RPM) to effectively decrease the capacity of the compressor 22 to meet the desired temperature and/or humidity setting within the interior space 18.

If the compressor 26 has not operated under those parameters in the past, the microprocessor 22 may operate the compressor 26 according a default operational speed. After completion of the operational cycle (i.e. receiving the off temperature signal), the microprocessor 22 determines the operational run time and the operational speed of the compressor 26 at the time the off signal is received; then, associates the operational run time and operational speed of the compressor 26 with an outdoor air temperature value of approximately 86° F. (approximately 30° C.) and time of day (1:00 PM) and stores that operational run time and operational speed in memory 24, for use in subsequent operation. As such, the computing element 20 "learns" the load of the building and may operate the compressor 26 according to the load to optimize the efficiency of the HVAC assembly 10.

The computing element 20 will perform the steps of the method on receipt of each control signal in order to operate the compressor 26 at the appropriate speed to meet the building demand of the HVAC assembly 10 according to an optimized system configuration chosen by the user, for example, comfort, or efficiency, or dehumidification, dry cooling, etc. to name a few non-limiting examples. The optimized system configuration may be based on building location, associated weather patterns, user's desire for system operation and other feature specific factors.

It will therefore be appreciated that at each control signal, the microprocessor 22 will receive outdoor air temperature data, determine the time of day the control signal was received, and determine if the operational run time of the last operation is within a pre-determined range; then, operate the compressor 26 at an appropriate speed to effectively learn the load of the system for a given time of day, at a given outdoor air temperature to efficiently operate the compressor 26 without the need of adding costly components configured to operate on a communicating type system bus.

While the disclosure has been illustrated and described in detail in the drawings and foregoing description, the same is to be considered as illustrative and not restrictive in character, it being understood that only certain embodiments have been shown and described and that all changes and modifications that come within the spirit of the disclosure are desired to be protected.

What is claimed is:

1. A method of operating a variable speed compressor, the variable speed compressor in electrical communication with a computing element and the computing element in electrical communication with a sensing device, the method comprising:
   (a) operating the computing element to transmit a control signal to the compressor to operate in an operational mode;
   (b) operating the computing element to receive outdoor air temperature data from the sensing device;
   (c) operating the computing element to determine an operational run time value of the compressor during a prior operational cycle in the operational mode under a same condition as the outdoor air temperature data;
   (d) operating the computing element to determine an estimated day period based in part on the control signal; and
   (e) operating the compressor at an operational speed based in part on the outdoor air temperature data, the operational run time value, and the estimated day period.

2. The method of claim 1, wherein step (a) further comprises operating the computing element to receive the control signal from a thermostat.

3. The method of claim 1, wherein the operational mode is chosen from a group consisting of a heating mode, a cooling mode, and a dehumidification mode.

4. The method of claim 1, wherein step (e) further comprises operating the computing element to transmit a speed signal to the compressor, wherein the speed signal is indicative of the operational speed.

5. The method of claim 1, wherein step (c) further comprises operating the computing element to determine if the operational run time value is greater than a pre-determined maximum operational threshold or less than a pre-determined minimum operational threshold.

6. An HVAC assembly comprising; an outdoor HVAC unit comprising:
   a variable speed compressor;
   a computing element in electrical communication with the variable speed compressor, the computing element configured to operate the variable speed compressor at an operational speed based in part on outdoor air temperature data, an operational run time value during a prior operational cycle in the operational mode under a same condition as the outdoor air temperature data, and an estimated day period.

7. The HVAC assembly in claim 6, further comprising a sensing device in electrical communication with the computing element, wherein the sensing device is configured to measure outdoor air temperature data.

8. The HVAC assembly of claim 7, further comprising a thermostat in electrical communication with the computing element, the thermostat configured to transmit a control signal to the computing element.

9. The HVAC assembly of claim 8, wherein the computing element is further configured to: (a) transmit the control signal to the variable speed compressor to operate in an operational mode; (b) receive the outdoor air temperature data from the sensing device; (c) determine an operational run time value of the variable speed compressor based in part on the outside air temperature data; and (d) determine an estimated day period based in part on the control signal.

10. The HVAC assembly of claim 9, wherein the computing element is further configured to receive the control signal from a thermostat.

11. The HVAC assembly of claim 9, wherein the operational mode is chosen from a group consisting of a heating mode, a cooling mode, and a dehumidification mode.

12. The HVAC assembly of claim 9, wherein the computing element is further configured to transmit a speed signal to the variable speed compressor, wherein the speed signal is indicative of the operational speed.

13. The HVAC assembly of claim 9, wherein the computing element is further configured to determine if the operational run time is greater than a pre-determined maximum operational threshold and less than a pre-determined minimum operational threshold.

14. A controller for use to control a variable speed compressor comprising:
   a processor;
   a memory in communication with the processor; wherein the processor is configured to operate a program stored in memory, the program configured to:
   (a) transmit a control signal to the variable speed compressor to operate in an operational mode;
   (b) receive outdoor air temperature data;
   (c) determine an operational run time value of the compressor during a prior operational cycle in the operational mode under a same condition as the outdoor air temperature data;
   (d) determine an estimated day period based in part on the control signal; and
   (e) operate the compressor at an operational speed based in part on the outdoor air temperature data, the operational run time value, and the estimated day period.

15. The controller of claim 14, wherein the program is further configured to receive the control signal.

16. The controller of claim 14, wherein the operational mode is chosen from the group consisting of a heating mode, a cooling mode, and a dehumidification mode.

17. The controller of claim 14, wherein the program is further configured to transmit a speed signal to the compressor, wherein the speed signal is indicative of the operational speed.

18. The controller of claim 14, wherein the program is further configured to determine if the operational run time value is greater than a pre-determined maximum operational threshold or less than a pre-determined minimum operational threshold.

* * * * *